(12) United States Patent
Hearty

(10) Patent No.: US 8,689,317 B2
(45) Date of Patent: Apr. 1, 2014

(54) PROVIDING SIP SIGNALING DATA FOR THIRD PARTY SURVEILLANCE

(75) Inventor: John Hearty, Golden, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 170 days.

(21) Appl. No.: 11/311,829

(22) Filed: Dec. 19, 2005

(65) Prior Publication Data
US 2007/0143858 A1  Jun. 21, 2007

(51) Int. Cl.
*G06F 9/00* (2006.01)

(52) U.S. Cl.
USPC ........ 726/14; 726/3; 726/10; 726/11; 726/12; 726/13; 713/153; 713/154; 379/35

(58) Field of Classification Search
USPC .............. 726/3, 10–14; 713/153, 154; 379/35
See application file for complete search history.

(56) References Cited

U.S. PATENT DOCUMENTS

| | | | |
|---|---|---|---|
| 6,741,595 B2 | 5/2004 | Maher, III et al. | |
| 6,816,482 B2 | 11/2004 | Crutcher et al. | |
| 7,006,508 B2 | 2/2006 | Bondy et al. | |
| 7,054,420 B2 | 5/2006 | Barker et al. | |
| 7,283,506 B2 * | 10/2007 | Mayer et al. | 370/338 |
| 7,626,980 B1 * | 12/2009 | Croak et al. | 370/352 |
| 8,098,281 B1 * | 1/2012 | Croak et al. | 348/143 |
| 2001/0052081 A1 | 12/2001 | McKibben et al. | |
| 2002/0009973 A1 | 1/2002 | Bondy et al. | |
| 2002/0051518 A1 | 5/2002 | Bondy et al. | |
| 2002/0172333 A1 * | 11/2002 | Gross et al. | 379/88.22 |
| 2002/0176404 A1 * | 11/2002 | Girard | 370/352 |
| 2003/0156576 A1 | 8/2003 | Crutcher et al. | |
| 2003/0190032 A1 * | 10/2003 | Ravishankar | 379/229 |
| 2003/0227917 A1 | 12/2003 | Maher et al. | |
| 2004/0047451 A1 | 3/2004 | Barker et al. | |
| 2004/0165703 A1 * | 8/2004 | Jones | 379/88.13 |
| 2004/0165709 A1 * | 8/2004 | Pence et al. | 379/201.01 |
| 2004/0240439 A1 | 12/2004 | Castleberry et al. | |
| 2005/0071434 A1 * | 3/2005 | Hettish et al. | 709/207 |
| 2005/0170829 A1 * | 8/2005 | Seo | 455/420 |
| 2005/0243802 A1 * | 11/2005 | Barclay et al. | 370/352 |
| 2006/0146792 A1 * | 7/2006 | Ramachandran et al. | 370/352 |

OTHER PUBLICATIONS

Gurbani et al., Terminating Telephony Services on the Internet, Aug. 2004, ACM Transactions of Networking vol. 12 No. 4, pp. 571-581.*

(Continued)

*Primary Examiner* — Luu Pham
*Assistant Examiner* — Roderick Tolentino

(57) ABSTRACT

A method for facilitating surveillance of a targeted user participating in communication sessions conducted over a communications network, such as a voice over Internet protocol (VoIP) network, that employs a session initiation protocol (SIP). The method includes receiving a subscription request from a third party subscriber, the subscription request identifying a targeted user to be monitored, monitoring communication sessions in which the targeted user is a participant, to detect SIP events corresponding to state transitions associated with the communication sessions. A system for facilitating surveillance of a targeted user includes an application programming interface (API) operable to receive a subscription request from a third party subscriber, the subscription request identifying the targeted user, wherein the third party subscriber is not a participant in the one or more communication sessions, and a SIP events monitoring module operable to detect one or more predetermined SIP events associated with the communication sessions based on the subscription request and notify the third party subscriber of the detected SIP events.

5 Claims, 12 Drawing Sheets

(56) References Cited

OTHER PUBLICATIONS

Roach, A.B., Session Initiation Protocol (SIP)-Specific Event Notification, Jun. 2002, The Internet Society, pp. 1-38.*
Rosenberg, J et al., SIP: Session Initiation Protocol, Jun. 2002, The Internet Society, pp. 1-268.*
Rosenberg, J et al., An Invite-Initiated Dialog Event Package for the Session Initiation Protocol (SIP), Nov. 2005, The Internet Society, pp. 1-39.*
Mahy, R, A Message Summary and Message Waiting Indication Event Package for the Session Initiation Protocol (SIP), Jun. 2004, The Internet Society, pp. 1-19.*
TeleStrategies: ISS World 2003; Intelligence Support Systems for Lawful Interception and Internet Surveillance; Nov. 13-14, 2003, pp. 1-362; McLean, VA.
Roach, A.B.; Standards Track; SIP-Specific Event Notification; Jun. 2002; pp. 1-36; http://www.ietf.org/rfc/rfc3265.txt.
Rosenberg et al.; Standards Track; Dialog Package; Nov. 2005; pp. 1-39; http://www.ietf.org/rfc/rfc4235.txt.
Mahy, R.; Standards Track; SIP Message Waiting; Aug. 2004; pp. 1-18; http://www.ietf.org/rfc/rfc3842.txt.
Franks et al.; Standards Track; HTTP Authentication; Jun. 1999; pp. 1-32; http://www.ietf.org/rfc/rfc2617.txt.
Calea 47 USC 1001-1010; Chapter 9—Interception of Digital and Other Communications.
"An Invite-Initiated Dialog Event Package for the Session Initiating Protocol (SIP)", Rosenberg, et al., Network Working Group, Request for Comments 4235, Standard Track, Nov. 2005, 37 pages, http://www.ietf.org/rfc/rfc4235.txt.
"A Message Summary and Message Waiting Indication Even Package for the Session Initiation Protocol (SIP)", Mahy, Network Working Group, Request for Comments 3842, Standards Track, Aug. 2004, 18 pages, http://www.ietf.org/rfc/rfc3842.txt.
"Session Initiation Protocol (SIP)-Specific Event Notification", Roach, Network Working Group, Request for Comments 3265, Standards Track, Jun. 2002, 36 pages, http://www.ietf.org/rfc/rfc2543.txt.
"HTTP Authentication: Basic and Digest Access Authentication", Franks et al., Network Working Group, Request for Comments 2617, Standards Track, Jun. 1999, 32 pages, http://www.ietf.or/rfc/rfc2617.txt.
"Title 47—Telegraphs, Telephones and Radiotelegraphs: Chapter 9—Interception of Digital and Other Communications", Communications Assistance for Law Enforcement Act, Calea—47 USC 1001-1010, Government Printing Office.
International Searching Authority, U.S. Patent and Trademark Office and Receiving Office, International Search Report (Form PCT/ISA/210) for international application No. PCT/US06/42744, Mar. 26, 2008, 2 pages.
International Searching Authority, U.S. Patent and Trademark Office and Receiving Office, Written Opinion of the International Searching Authority (Form PCT/ISA/237) for international application No. PCT/US06/42744, Mar. 26, 2008, 3 pages.

* cited by examiner

500

F1: Tap entity to SPM

SUBSCRIBE sip : Communicator _Address@level3.net SIP/2.0
Via: SIP/2.0/UDP 64.12.196.167:5060;branch=z9hG4bK50603232286714-10000001
From: <sip:64.12.196.167>;tag=TapEntitytag 1
To: <sip:Communicator _Address @level3.net>
Call-ID: FBICALLID 1234@64.12.196.167
Cseq: 1 SUBSCRIBE
Contact: <sip:64.12.196.167:5060>
Event: dialog
Max-Forwards: 70
Accept: application/dialog-info+xml
Expires: 315360000
Content-Length: 0

F2: SPM to tap entity

SIP/2.0 401 Unauthorized
Via: SIP/2.0/UDP 64.12.196.167:5060;branch=z9hG4bK50603232286714-10000001
From: <sip:64.12.196.167>;tag=TapEntitytag 1
To: <sip:Communicator _Address @level3.net>;tag=SPMtag 1
Call-ID: FBICALLID 1234@64.12.196.167
Cseq: 1 SUBSCRIBE
WWW-Authenticate : Digest
realm="LEA_Subscribers",domain="sip:spm.level3.net",nonce="7cf23fe20967903a0
9a6a1cf7a745b28",opaque="",stale=FALSE,algorithm=MD5
Content-Length: 0

505 — F3: Tap entity to SPM        510

SUBSCRIBE sip : Communicator _Address@level3.net SIP/2.0
515 — Via: SIP/2.0/UDP 64.12.196.167:5060;branch=z9hG4bK50603232286714-10000002
   From: <sip:64.12.196.167>;tag=TapEntitytag 2
   To: <sip:Communicator _Address @level3.net>
   Call-ID: FBICALLID 1234@64.12.196.167
520 — Cseq: 2 SUBSCRIBE
   Contact: <sip:64.12.196.167:5060>
   Event: dialog
525 — Max-Forwards: 70
   Accept: application/dialog-info+xml
   Expires: 315360000
   Authorization : Digest
530 { username="WashingtonFBI",realm="LEA_Subscribers",nonce="7cf23fe20967903a0
   9a6a1cf7a745b28",uri="sip:Communicator _Address @level3.net",response="e7681e
   bfbe62a7be06411583dfa3ad00"
   Content-Length: 0

Fig. 5a

F4: SPM to tap entity

SIP/2.0 200 OK
Via: SIP/2.0/UDP 64.12.196.167:5060;branch=z9hG4bK 50603232286714-10000002
From: <sip:64.12.196.167>;tag=TapEntitytag2
To: <sip:Communicator_Address@level3.net>;tag=SPMtag2
Call-ID: FBICALLID 1234@64.12.196.167
Cseq: 2 SUBSCRIBE
Contact: <sip:65.56.80.202:5060;transport=udp>
Expires: 315360000
Content-Length: 0

F5: SPM to tap entity

NOTIFY sip:64.12.196.167:5060 SIP/2.0
Via: SIP/2.0/UDP 65.56.80.202:5060;branch=z9hG4bK 50603232286714-3073754899
From: <sip:Communicator_Address@level3.net>;tag=SPMtag2
To: <sip:64.12.196.167>;tag=TapEntitytag2
Call-ID: FBICALLID 1234@64.12.196.167
Cseq: 1 NOTIFY
Contact: <sip:65.56.80.202:5060;transport=udp>
Event: dialog
Max-Forwards: 70
Content-Type: application/dialog-info+xml
Content-Length: ...

```
<?xml version="1.0"?>
    <dialog-info xmlns="urn:ietf:params:xml:ns:dialog-info"
535         version="0" state="full"
            entity="sip:Communicator_Address@level3.net"
    </dialog-info>
```

F6: Tap entity to SPM

SIP/2.0 200 OK
Via: SIP/2.0/UDP 65.56.80.202:5060;branch=z9hG4bK 50603232286714-3073754899
From: sip:Communicator_Address@level3.net;tag=SPMtag2
To: <sip:64.12.196.167>;tag=TapEntitytag2
Call-ID: FBICALLID 1234@64.12.196.167
Cseq: 1 NOTIFY
Contact: <sip:64.12.196.167:5060>
Content-Length: 0

Fig. 5b

F18: SPM to tap entity

NOTIFY sip:64.12.196.168:5060 SIP/2.0
Via: SIP/2.0/UDP 65.56.80.202:5060;branch=z9hG4bK50603232286714-3073754900
From: sip:Communicator_Address@level3.net;tag=SPMtag2
To: <sip:64.12.196.167>;tag=TapEntitytag2
Call-ID: FBICALLID1234@64.12.196.167
Cseq: 2 NOTIFY
Contact: <sip:65.56.80.202:5060;transport=udp>
Event: dialog
Max-Forwards: 70
Content-Type: application/dialog-info+xml
Content-Length: ...

```
<?xml version="1.0"?>
<dialog-info xmlns="urn:ietf:params:xml:ns:dialog-info"
540            version="0" state="full"
               entity="sip:Communicator_Address@level3.net"
545     <dialog id="as7d900as8" call-id="a84b4c76e66710"
               local-tag="1928301774" direction="recipient">
550       <state>trying</state>
555       <local>
             <identity>sip:Communicator_Address@level3.net</identity>
560       </local>
565       <remote>
             <identity>sip:+12012230003@64.12.196.138</identity>
          </remote>
        </dialog>
</dialog-info>
```

F19: Tap entity to SPM

SIP/2.0 200 OK
Via: SIP/2.0/UDP 65.56.80.202:5060;branch=z9hG4bK50603232286714-3073754900
From: sip:Communicator_Address@level3.net;tag=SPMtag2
To: <sip:64.12.196.167>;tag=TapEntitytag2
Call-ID: FBICALLID1234@64.12.196.167
Cseq: 2 NOTIFY
Contact: <sip:64.12.196.167:5060>
Content-Length: 0

Fig. 5c

F25: SPM to tap entity

NOTIFY sip:64.12.196.168:5060 SIP/2.0
Via: SIP/2.0/UDP 65.56.80.202:5060;branch=z9hG4bK 50603232286714-3073754901
From: sip:Communicator_Address@level3.net;tag=SPMtag2
To: <sip:64.12.196.167>;tag=TapEntitytag2
Call-ID: FBICALLID 1234@64.12.196.167
Cseq: 3 NOTIFY
Contact: <sip:65.56.80.202:5060;transport=udp>
Event: dialog
Max-Forwards: 70
Content-Type: application/dialog-info+xml
Content-Length: ...

```
<?xml version="1.0"?>
<dialog-info xmlns="urn:ietf:params:xml:ns:dialog-info"
      version="0" state="full"
      entity="sip:Communicator_Address@level3.net"
  <dialog id="as7d900as8" call-id="a84b4c76e66710"
      local-tag="1928301774" direction="recipient">
    <state>early</state>
    <local>
      <identity>sip:Communicator_Address@level3.net</identity>
    </local>
    <remote>
      <identity>sip:+12012230003@64.12.196.138</identity>
    </remote>
  </dialog>
</dialog-info>
```

570 — version="0" state="full" / entity line
575 — dialog local-tag line

F26: Tap entity to SPM

SIP/2.0 200 OK
Via: SIP/2.0/UDP 65.56.80.202:5060;branch=z9hG4bK 50603232286714-3073754901
From: sip:Communicator_Address@level3.net;tag=SPMtag2
To: <sip:64.12.196.167>;tag=TapEntitytag2
Call-ID: FBICALLID 1234@64.12.196.167
Cseq: 3 NOTIFY
Contact: <sip:64.12.196.167:5060>
Content-Length: 0

Fig. 5d

F35: SPM to tap entity

NOTIFY sip:64.12.196.168:5060 SIP/2.0
Via: SIP/2.0/UDP 65.56.80.202:5060;branch=z9hG4bK 50603232286714-3073754902
From: sip:Communicator_Address@level3.net;tag=SPMtag2
To: <sip:64.12.196.167>;tag=TapEntitytag 2
Call-ID: FBICALLID 1234@64.12.196.167
Cseq: 4 NOTIFY
Contact: <sip:65.56.80.202:5060;transport=udp>
Event: dialog
Max-Forwards: 70
Content-Type: application/dialog-info+xml
Content-Length: ...

```
<?xml version="1.0"?>
<dialog-info xmlns="urn:ietf:params:xml:ns:dialog-info"
       version="0" state="full"
       entity="sip:Communicator_Address@level3.net"
   <dialog id="as7d900as8" call-id="a84b4c76e66710"
       local-tag="1928301774" direction="recipient">
    <state>confirmed</state>
    <local>
      <identity>sip:Communicator_Address@level3.net</identity>
    </local>
    <remote>
      <identity>sip:+12012230003@64.12.196.138</identity>
    </remote>
   </dialog>
</dialog-info>
```

580 — points to version/entity lines
585 — points to dialog id / local-tag line

F36: Tap entity to SPM

SIP/2.0 200 OK
Via: SIP/2.0/UDP 65.56.80.202:5060;branch=z9hG4bK 50603232286714-3073754902
From: sip:Communicator_Address@level3.net;tag=SPMtag2
To: <sip:64.12.196.167>;tag=TapEntitytag 2
Call-ID: FBICALLID 1234@64.12.196.167
Cseq: 4 NOTIFY
Contact: <sip:64.12.196.167:5060>
Content-Length: 0

Fig. 5e

F45: SPM to tap entity

NOTIFY sip:64.12.196.168:5060 SIP/2.0
Via: SIP/2.0/UDP 65.56.80.202:5060;branch=z9hG4bK 50603232286714-3073754903
From: sip:Communicator_Address@level3.net;tag=SPMtag2
To: <sip:64.12.196.167>;tag=TapEntitytag2
Call-ID: FBICALLID1234@64.12.196.167
Cseq: 5 NOTIFY
Contact: <sip:65.56.80.202:5060;transport=udp>
Event: dialog
Max-Forwards: 70
Content-Type: application/dialog-info+xml
Content-Length: ...

```
<?xml version="1.0"?>
<dialog-info xmlns="urn:ietf:params:xml:ns:dialog-info"
      version="0" state="full"
      entity="sip:Communicator_Address@level3.net"
  <dialog id="as7d900as8" call-id="a84b4c76e66710"
      local-tag="1928301774" direction="recipient">
   <state event="remote-bye">terminated</state>
   <local>
     <identity>sip:Communicator_Address@level3.net</identity>
   </local>
   <remote>
     <identity>sip:+12012230003@64.12.196.138</identity>
   </remote>
  </dialog>
</dialog-info>
```

590 points to the `<dialog-info ... entity=...>` block.
595 points to the `<dialog ... local-tag=...>` / `<state ...>` block.

F46: Tap entity to SPM

SIP/2.0 200 OK
Via: SIP/2.0/UDP 65.56.80.202:5060;branch=z9hG4bK 50603232286714-3073754903
From: sip:Communicator_Address@level3.net;tag=SPMtag2
To: <sip:64.12.196.167>;tag=TapEntitytag2
Call-ID: FBICALLID1234@64.12.196.167
Cseq: 5 NOTIFY
Contact: <sip:64.12.196.167:5060>
Content-Length: 0

Fig. 5f

PROVIDING SIP SIGNALING DATA FOR THIRD PARTY SURVEILLANCE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2005 Level 3 Communications, Inc.

TECHNICAL FIELD

Embodiments of the present invention generally relate to systems and methods to providing SIP signaling data for third party surveillance, and more specifically for notifying a third party of SIP events related to a selected user communicating over a communications network.

BACKGROUND

Authorized electronic surveillance is an indispensable tool used by various law enforcement entities in the fight against crime and terrorism. In 1994, in order to preserve the ability of law enforcement entities to conduct electronic surveillance with the continuing advances in the telecommunications industry, Congress passed the Communications Assistance for Law Enforcement Act (CALEA). The law defines the statutory obligations of telecommunication carriers to assist law enforcement entities with properly authorized electronic surveillance. At a high level, CALEA requires carriers to design or modify their systems to ensure that the appropriate level of electronic surveillance may be performed. Specifically, CALEA ensures that telecommunications carriers will have the necessary capability, and sufficient capacity, to assist law enforcement entities in various types of electronic surveillance regardless of the telecommunications carriers' specific systems or services.

Electronic surveillance typically refers to either the interception of call content, commonly referred to as full wiretaps, and/or the interception of call-identifying information, commonly referred to as partial wiretaps, through the use of pen registers and/or trap and trace devices. Full wire taps allow the interception of the call content and allow the law enforcement entity to hear all of the conversations that occur. In contrast, a partial wiretap only allows the law enforcement entity to find what numbers have been dialed, incoming calls, and the like.

As technology advances, communication carriers are required to provide support for electronic surveillance. In Voice over Internet Protocol (VoIP) networks, for example, one solution has been to specify the P-DCS-LAES header to signal the need to send a copy of signaling, and optionally content, as the call is setup. Typically this type of mechanism for marking an endpoint as requiring lawfully authorized surveillance is undefined and proprietary. Communication carriers have used Private Session Initiation Protocol (SIP) proxy-to-proxy extensions to support the packet cable distributed call signaling architecture. One disadvantage to this approach, however, is that it does not provide any mechanism for identifying a surveillance requestor as being authorized. Another common method used in some VoIP networks is to route all the media packets and signaling through a centralized location which then determines which media packets and signaling information should be monitored and reported to the law enforcement agency.

Thus, a need exists for systems and methods for collecting call signaling and event notification information of a monitored user based on an authorized surveillance request.

SUMMARY

Embodiments are described herein that facilitate surveillance of a targeted user of a network by monitoring communication sessions for designated signals. A third party can subscribe to dialogs associated with a targeted user. If the third party is authorized to conduct surveillance of the targeted user, the third party is notified of predetermined signals of interest associated with communications sessions in which the targeted user participates. Notification to the third party can identify the initiator, recipient, duration, terminator, and other attributes of the communication session. In addition, the third party could be notified as to content sent to or received by the targeted user.

A method for facilitating surveillance of a targeted user participating in communication sessions conducted over a voice over Internet protocol (VoIP) network that employs a session initiation protocol (SIP). The method includes receiving a subscription request from a third party subscriber, the subscription request identifying a targeted user to be monitored, monitoring communication sessions in which the targeted user is a participant, to detect SIP events corresponding to state transitions associated with the communication sessions.

A system for facilitating surveillance of a targeted user includes an application programming interface (API) operable to receive a subscription request from a third party subscriber, the subscription request identifying the targeted user, wherein the third party subscriber is not a participant in the one or more communication sessions, and a SIP events monitoring module operable to detect one or more predetermined SIP events associated with the communication sessions based on the subscription request and notify the third party subscriber of the detected SIP events.

A more complete understanding of various embodiments of the present invention may be derived by referring to the detailed description of preferred embodiments and claims when considered in connection with the figures.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 5a-5f provides an exemplary detailed subscription request and notification dialog in accordance with one embodiment of the present invention;

DETAILED DESCRIPTION

Figure 1:
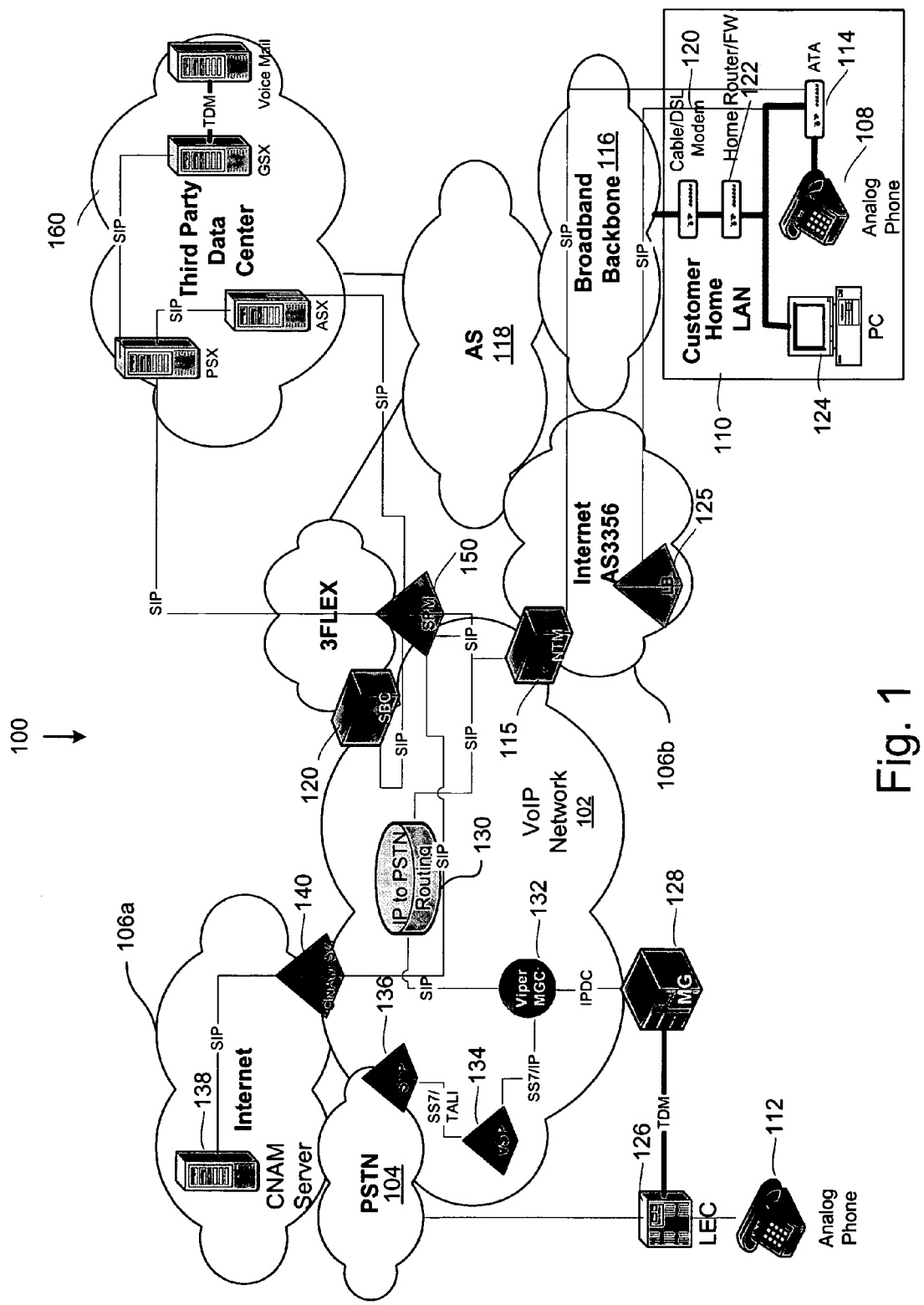
FIG. 1 is a high level block diagram of a Voice over Internet Protocol network (VoIP) that may be used in accordance with one embodiment of the present invention.

Embodiments of the present invention generally relate to systems and methods to facilitate surveillance of a targeted user participating in communication sessions over a communications network. Communication sessions associated with a targeted user are monitored to detect predetermined signaling events based on an authorized surveillance request from a third party subscriber.

Some embodiments include a VoIP network operable to facilitate electronic surveillance of a selected network user by law enforcement in compliance with Communications Assistance for Law Enforcement Act (CALEA) requirements. In this regard, some embodiments of the present invention provide a general event notification framework by including a dialog event package to allow authorized third party entities to subscribe to dialog events for selected users.

In various embodiments, the dialog event package can use a standard communication protocol to notify the third party subscriber of designated types of session initiation protocol (SIP) events associated with communication sessions in which a targeted user participates. For example, common signaling events include, but are not limited to communication session setup (or attempted setup) and termination. SIP data that can be communicated to the third party subscriber includes, but is not limited to origin, duration, direction, destination, or termination, dialed digit extraction when the digits are involved in session setup, party/hold/join/drop information, in-band/out-of-band signaling, and timing information.

Although various embodiments discussed throughout this specification focus on monitoring of dialog state changes, some embodiments may provide for the monitoring of content. For example, in addition to monitoring SIP signaling events, one or more embodiments may detect and record other types of content, such as instant messages (IMs), document data, video data, image data, and others. As another example, content conveyed through proprietary or other non-standard extensions of SIP messages may be monitored and recorded.

While various embodiments of the present invention have been described for illustrative purposes in relation to a VoIP communications network, the scope of various embodiments of the invention are not limited to VoIP communications networks. More generally, embodiments of the present invention are equally applicable to reporting state changes on any type of media communications session established with SIP. Examples of such media communications include, but are not limited to, voice, video, text, fax, instant messaging (IM), and the like. In addition, for the purposes of explanation, numerous specific details are set forth in the specification below in order to provide a thorough understanding of embodiments of the present invention. It will be apparent, however, to one skilled in the art that embodiments of the present invention may be practiced without some of these specific details.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

TERMINOLOGY

Brief definitions of terms, abbreviations, and phrases used throughout this application are given below.

The terms "connected" or "coupled" and related terms are used in an operational sense and are not necessarily limited to a direct physical connection or coupling.

The phrases "in one embodiment," "according to one embodiment," and the like generally mean the particular feature, structure, or characteristic following the phrase is included in at least one embodiment of the present invention, and may be included in more than one embodiment of the present invention. Importantly, such phases do not necessarily refer to the same embodiment.

If the specification states a component or feature "may", "can", "could", or "might" be included or have a characteristic, that particular component or feature is not required to be included or have the characteristic.

The term "endpoint" can be a logical location on a communication network such that communications ongoing in relation to the logical location can be targeted, a physical location such that communications emerging from the geographic location are targeted, and/or an individual or entity such that communications associated with the individual or entity are targeted.

A "communicator" is used in its broadest sense to include endpoints and/or communication devices. Thus, a communicator can be a location (physical or logical) where a transmission is sent to/from, an entity or individual associated with communications, and/or a communication device capable of receiving and/or sending such transmissions. In some cases, transmissions can be real time transmissions including, but not limited to, video, audio, chat rooms, instant messaging, combinations of the aforementioned, and/or the like.

The term "signal path manager" generally refers to a feature server, such as a class five type switch for Voice over Internet Protocol (VoIP) endpoints, or other back-to-back user agents as known by those skilled in the art.

The term "call-identifying information" generally refers to dialing or signaling information that identifies the origin, direction, destination, or termination of each communication generated or received by a subscriber by means of any equipment, facility, or service of a telecommunications carrier. This term may also encompasses additional information such as dialed digit extraction, party/hold/join/drop information, subject initiated dialing and signaling, in-band/out-of-band signaling, timing information, and the like. This is meant to be an exemplary list of information which is encompassed by this term. By no means is this list meant to be exhaustive. As such, other information, as known by those skilled in the art, is included within the coverage of this definition.

The term "third party" refers to an entity that is not a participant in a communication session to be monitored. When a third party subscribes to dialogs of a selected target user, the third party is referred to as a third party subscriber. Tap entities and other surveillance entities can be types of third party subscribers. Internet service providers can also be third party subscribers.

The term "tap entity" generally refers to any entity which is lawfully authorized, or otherwise legally entitled, to perform electronic surveillance or record and monitor transmissions or other call-identifying information from endpoints of a telecommunications carrier. For example, common tap entities may include, but need not be limited to, law enforcement agencies such as the Federal Bureau of Investigation (FBI), Drug Enforcement Agency (DEA), Immigration/Naturalization Service (INS), Central Intelligence Agency (CIA), local and state police, and the like. A network communications provider may be legally required, for example under the Communications Assistance for Law Enforcement Act (CALEA), to assist in tapping an endpoint communication device. In other situations, other agencies or entities may be entitled to record and monitor transmissions or other call-identifying information from a telecommunications carrier. For example, an internet service provider (ISP) may have the right to be notified of all VoIP transmission destined for 911.

The term "SIP data" generally refers to any data carried by, or associated with, a SIP protocol that could be surveilled (e.g., monitored, detected, notified upon). By way of example, but not limitation, SIP data could include any information included in, or capable of being derived from, a SIP protocol message or data associated with the SIP protocol message. For example, SIP data includes, but need not be limited to, both message headers and message content. SIP headers, SIP header extension parameters, Uniform Resource Information (URI) extension parameters, and various SIP message bodies containing content such as text, documents or any other type of computer file, digital signatures, Instant Messages, images, icons, audio, video, or links to other information anywhere on the Internet or other computer networks are covered by this term. In addition, SIP data may also include information such as a time stamp, an initiator identifier, a recipient identifier, a target user identifier, a communication session identifier, an event attribute, a replace element, a referred-by element, a state element, a duration element, and local and remote elements containing an identity element, a target element, and a session description element may be considered SIP data.

The phrase "communication network" or term "network" generally refers to a group of interconnected devices capable of exchanging information. A communication network may be as few as several personal computers on a Local Area Network (LAN) or as large as the Internet, a worldwide network of computers. As used herein "communication network" is intended to encompass any network capable of transmitting information from one entity to another. In one particular case, a communication network is a Voice over Internet Protocol (VoIP) network. In some cases, a communication network may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Exemplary Operating Environment

FIG. 1 illustrates an exemplary network 100 in accordance with various embodiments of the present invention for facilitating a third party in conducting surveillance of communication sessions of a selected network user. Surveillance generally involves monitoring and/or acquiring signaling data associated with a communication device of the network user. In law enforcement, such surveillance is referred to as "tapping". In embodiments described herein, signaling data includes any signals related to setting up, modifying, refreshing, tearing down, and the like of a communication session in a session initiation protocol (SIP) environment. Accordingly, embodiments provide for surveillance of a selected user's communication device to monitor and/or acquire signals to and/or from the user's communication device over a SIP-enabled network.

As such, network 100 enables SIP communications to/from devices in operable communication with the network 100. To facilitate such communications, network 100 includes a number of subnetworks and components. For example, network 100 includes voice-over-Internet-Protocol (VoIP) network 102, public switched telephone network (PSTN) 104, Internet 106a and Internet 106b, each of which may include subnetworks of their own.

Via the subnetworks, one communication device can cause a communication session to be set up with another communication device. For example, an analog telephone 108 in a home network 110 can attempt to set up a communication session with a second analog telephone 112, or vice versa. Analog telephone 108 is connected to terminal adapter 114, which facilitates communication between the analog telephone 108 and digital broadband network 116, which enables communications to/from Internet 106b and/or autonomous system (AS) 118.

Home network 110 may also include a broadband modulator/demodulator (MODEM) 120 for interfacing with the broadband network 116, and a router/firewall (FW) 122 for routing data within the home network 110 and/or to/from the broadband network 116, and/or performing security functions. Although the network 110 is described as a home network 110, the components and functions of network 110 are also applicable to other types of end-user networks, such as, but not limited to office and corporate intranets. The components within network 110 can be wirelessly connected, wired, or any combination thereof.

In another exemplary scenario, a communication session can be set up between a computing device, such as desktop computer 124 and another network-based communication device, such as the second analog telephone 112. In this regard, desktop computer 124 accesses broadband network 116 through router/firewall 122 and broadband MODEM 120.

The second analog telephone 112 accesses network 100 via local exchange carrier (LEC) 126. LEC 126 can access PSTN 104 and/or VoIP 102 via media gateway (MG) 128. PSTN typically uses signaling system 7 (SS7) for setting up communication sessions. LEC 126 is able to interface with SS7 directly. To communicate over the VoIP network 102, LEC 126 uses time division multiplexing (TDM) to communicate with the MG 128, which converts the communications from the LEC 126 into a protocol, such as Real Time Protocol (RTP), which can be used over the VoIP network 102.

VoIP network 102 includes components that perform various functions to facilitate communications within the network 100. For example, VoIP network 102 includes a media gateway controller (MGC) 132 which communicates with MG 128 via internet protocol device control (IPDC). MGC 132 is also able to communicate with Signaling Gateway (SG) 134. SG 134 provides a signaling interface from analog phone 112 which has been routed through PSTN 104 via Signaling Transfer Point (STP) 136 to MGC 132. MGC 132 is able to interface with IP to PSTN Routing element 130 via SIP messaging. A network address translator (NAT) traversal manager (NTM) 115 uses SIP signaling and RTP to enable SIP signaling and RTP to traverse a NAT (not shown) and/or router/FW 122 that may be operating at network 110. Caller identification (ID) with name (CNAM) server 138 provides caller name information (caller ID) for calls made across internet 106a via a CNAM Signaling Gateway 140 to the Signal Path Manager (SPM) 150.

Of course, other network elements known to those skilled in the arts may be used with the exemplary network 100 shown, while some elements shown in this configuration may not be present in other network setups. For example, various proprietary media gateways interfacing various border networks including one or more local exchange carriers and other border network elements used in relation to a PSTN, internet service provider (ISP), or other border network type may be used.

Real time transport protocol (RTP) is typically utilized to communicate dialog content between various communicating users. For signaling purposes, session initiation protocol (SIP) is used between some of the elements, and SS7 protocol is used between various other elements. Voice over IP (VoIP) network 102 can be implemented, for example, by a wholesale telecommunications service provider that sells services to other carriers or service providers, and/or directly to an end user of telecommunication services. Network 102 can be used to pass transmissions internally as IP packets, but provide the transmissions externally in one or more defined formats. From a signaling perspective, network 102 provides an ability to support SS7 signaling to a PSTN as well as accepting SIP signaling from customers and carriers.

In accordance with various embodiments, VoIP network 102 is also configured to assist a third party in conducting surveillance of network users. One example of a third party entity is referred to as a tap entity. Generally speaking, a tap entity is any entity which is lawfully authorized or otherwise legally entitled to perform electronic surveillance, such as recording and/or monitoring signals associated with communication sessions between targeted endpoints. For example, common tap entities may include, but need not be limited to, law enforcement agencies such as the FBI, DEA, local and state police, and the like.

VoIP network 102 service provider may be legally required, for example under the Communications Assistance for Law Enforcement Act (CALEA), to assist in tapping an endpoint communication device. In other situations, other agencies or entities may be entitled to record and monitor transmissions or other call-identifying information from a telecommunications carrier. For example, an internet service provider (ISP) may have the right to be notified of all VoIP transmission destined for 911. In addition, tap entity may have a private surveillance network 160 by which the tap entity conducts surveillance. Embodiments of the present invention provide an SPM 150, with which the surveillance network 160 interfaces.

Various functions of SPM 150 support the tap-entity 160 in monitoring call-identifying information of one or more communicators. In one embodiment, SPM 150 is a feature server, such as a class-5 soft switch for Voice over Internet Protocol (VoIP) endpoints. In other embodiments, a feature server may represent a registrar server. Feature servers are generally servers that are operable to provide one or more services supported by a communications network, such as VoIP network 102. For example, a feature server may provide telecommunications services, such as caller identification, call forwarding, voice mail, and/or the like.

Various functions are provided by SPM 150 to facilitate surveillance. Specific embodiments of exemplary functions are described below. Briefly, these various functions support the tap-entity 160 in conducting a partial tap of a targeted endpoint. A partial tap generally involves monitoring signaling information. Signaling information can include, without limitation, call-identifying information, dialing information, call setup information, or any other information that identifies the origin, direction, destination, or termination of each communication generated or received by a targeted endpoint by means of any equipment, facility, or service of a telecommunications carrier. SPM 150 may also encompasses additional features to provide tap-entity 160 information such as dialed digit extraction, party/hold/join/drop information, subject initiated dialing and signaling, in-band/out-of-band signaling, timing information, and the like.

In accordance with another embodiment, SIP content could be surveilled, in addition to, or in place of, SIP event signaling information. Such SIP content may include any content that can be attached to, and/or carried with, a SIP message. Such content is typically in the form of a content object. For example, SIP supports Instant Messaging, whereby, the content of instant messages (IMs) can be attached as a message body to SIP messages, similar to the manner in which documents can be attached to email messages. As those of ordinary skill in the art will appreciate, many other types of content currently exist that could be attached to SIP messages, and future types of content yet to be defined could be attached to SIP messages. These additional types of content are also capable of being used with various embodiments of the present invention. Some examples include, but are not limited to, documents or any other type of computer file, Icons, image, sound or video files, digital signatures, security certificates, and/or links to information anywhere on the Internet or other computer network. In addition, more than one type of content may be attached to a single SIP message, and more than one content object of the same type may be attached to a single SIP message.

Signal path manager 150 is configured to provide one or more of the following functions: registrar capabilities, monitor endpoint dialogs and other transmissions, record endpoint dialogs, generate a report, and/or forward the dialog transmissions to an acquisition facility or other destination specified by a tap entity. Embodiments of the SPM 150 employ a dialog event package that is capable of detecting SIP signals. The SPM 150 can facilitate CALEA compliance while supporting voice services commonly supported across IP networks. In addition, the SPM generally requires minimal architectural changes to such networks.

In particular, network 100 provides an architecture for directing signaling information of transmissions that can include, but are not limited to, dialed digit extraction, party/hold/join/drop information, subject initiated dialing and signaling, in-band/out-of-band signaling, timing information, origin, direction, destination, or termination of each communication generated or received by a subscriber or endpoint by means of any equipment, facility, or service of a telecommunications carrier. Various embodiments also include an acquisition facility or other destination which may include an acquisition server, a distribution function server, and an administrator.

When SPM 150 receives a transmission, SPM 150 determines if one or more of the communicators associated with the transmission have been designated for surveillance. When SPM 150 has determined that a transmission has been designated, or selected, for acquisition, SPM 150 directs the signaling associated with the transmission to the destination endpoint(s) indicated by the transmission. In addition, SPM 150 directs a copy of the call-identifying information in real-time, or the information which has been recorded, to the surveillance network 160. The signaling protocol and/or interface between the SPM 150 and surveillance network 160 can include a proprietary interface or an existing standard for encapsulation and/or representation of the SIP signaling event information. In either case, SPM 150 passes the transmission to a surveillance network 160. For example, according to some embodiments, the dialog event package for SIP events framework can report desired SIP dialog state information represented using a standard general markup language (SGML). For example, eXtensible Markup Language (XML) or a language based on XML such as Geography Markup Language (GML), RDF/XML, RSS, MathML, XHTML, SVG, MusicXML and cXML may be used.

In accordance with various embodiments, tap requests and notification can be passed via a transmission protocol and/or interface that can be proprietary, or can be implemented using extensions to open standard protocols, such as SIP, for example using Subscribe and/or Notify methods. In some cases, such notification includes providing a computer readable medium with a list of communicators selected for acquisition, and an indication that the list has been modified. This list can be accessed in real time by SPM, or can be transferred on occasion to a computer readable medium more easily accessible to other interested devices.

According to one embodiment, a signal path manager is introduced into a general system architecture which adds registrar capabilities to the existing edge proxy server. In addition to supporting partial taps in accordance with CALEA, various embodiments also relate to supporting other collection of call-identifying information that may not be required by CALEA. For example, various embodiments also support monitoring dialogs of communicators which may then be used to report event specific transmission data, to an ISP. One example of an event specific transmission is a 911 call. In this case, call identifying information from a communicator calling 911 is forwarded to an ISP.

Exemplary System

Figure 2:
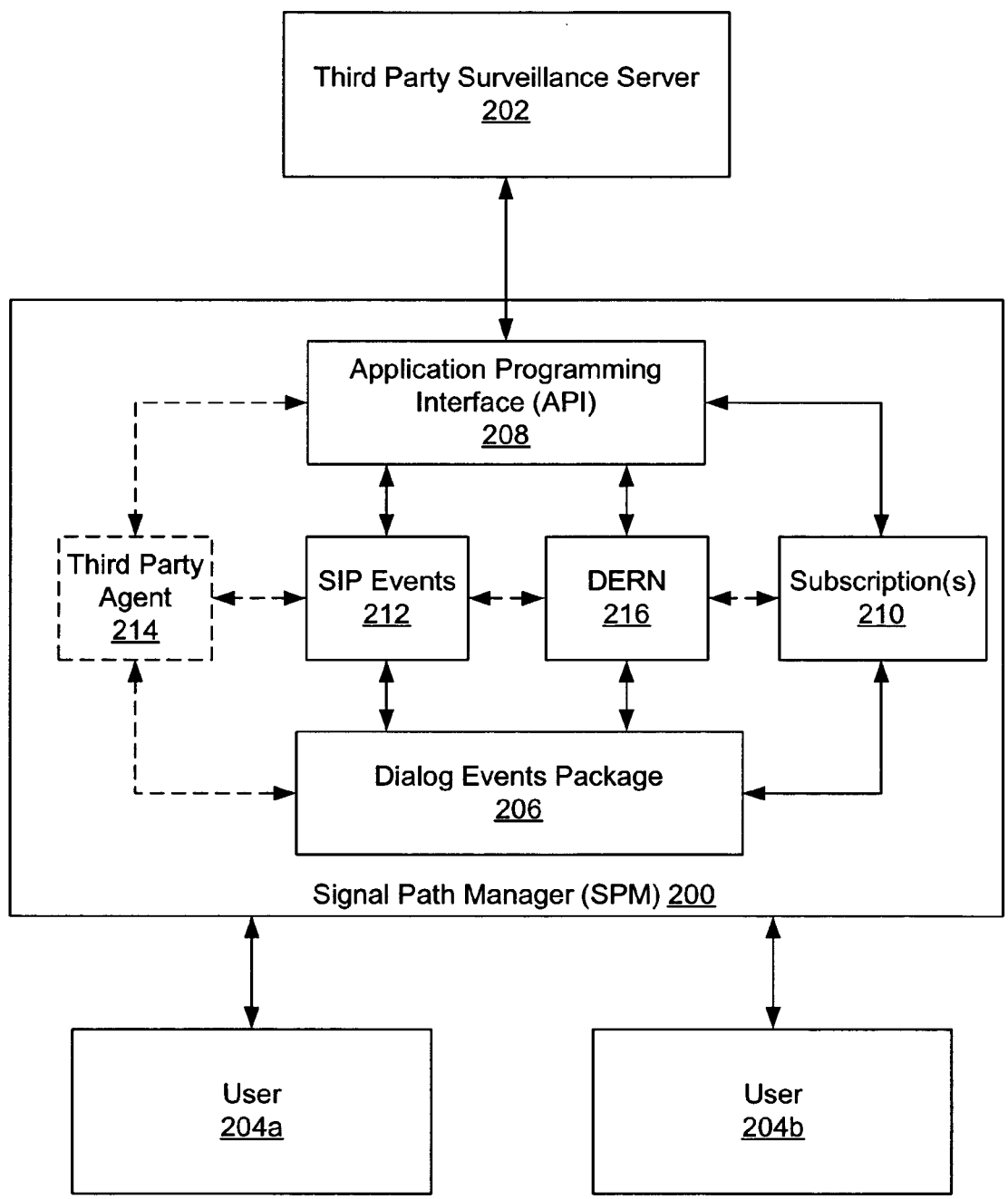
FIG. 2 is a functional block diagram illustrating a signal path manager in operable communication with a third party to carry out surveillance in accordance with one embodiment.

FIG. 2 is a functional block diagram illustrating an exemplary embodiment of a signal path manager (SPM) 200 interfacing with a third party server 202 to provide SIP events data related to one or more selected users 204*a* or 204*b*. In FIG. 2, user 204*a* is communicating with user 204*b* using a SIP based communications methodology. SPM 200 receives all SIP messages setting up the communication session between user 204*a* and user 204*b*. As discussed above, embodiments of SPMs include a SIP events application for monitoring SIP events. In the particular embodiment shown, the SPM 200 includes a dialog events package (DEP) 206 and dialog event routing node (DERN) 216, which are used to monitor dialogs and/or dialog events of users 204*a* and 204*b* selected by the third party.

The DEP 206 can be any DEP as may be known in the art, and may be a proprietary or publicly available package. The third party server 202 communicates to the SPM 200 via an application programming interface (API) 208. One embodiment of the API 208 employs open standards, such as SIP extended with RFC 3265 and an industry standard dialog event package such as described in RFC 4235. RFC 3265 and RFC 4235 are hereby incorporated by reference for all purposes. Other embodiments could employ a proprietary API.

In other embodiments, the API 208 can be integrated with the DEP 206. To have user(s) 204*a* and/or user(s) 204*b* traced, third party server 202 subscribes to dialogs of the user(s) 204*a* and/or user(s) 204*b*. As is discussed in more detail below, the third party server 202 issues a subscription request to the SPM 200 for each user 204*a* and/or 204*b* for which the third party wants to monitor dialogs. The DEP 206 can determine if the third party is authorized, and, if so, store valid subscriptions 210 in memory for later access.

Based on the subscriptions 210, DEP 206 monitors dialogs of associated users 204. DEP 206 detects predetermined events in SIP signals to and from the monitored users 204. Exemplary events include call attempt, call establishment, call modification, and call termination. The DEP 206 can then notify the third party server 202 of the predetermined events. The DEP 206 may store and retrieve data 212 related to SIP events to/from memory. In one embodiment, the DEP 206 can notify the third party server 202 in real-time.

According to one embodiment, SIP signaling passed between communicators, such as user 204*a* and user 204*b*, are intercepted by SPM 200. Depending on the direction of the SIP signaling message, either of the communicators could be a destination communicator or a sending communicator. In this case, sending and destination are in reference to the SIP messaging and not to the call originator and the call destination. Again, SPM 200 is logically positioned between the communicators. It is not necessary that SPM 200 be physically located between the communicators.

In the embodiment depicted in FIG. 2, SPM comprises DERN 216. In one embodiment, DERN 216 may be a software package or component. In another embodiment, DERN 216 may be implemented by hardware components. No matter whether DERN 216 is implemented in hardware, software, or a combination thereof, DERN 216 may be configured to pass one copy of the SIP message to the appropriate destination user 204*a* or 204*b*. To this end, the copy of the SIP message may be passed to a first child node which lies on the path between DERN 216 and the destination communicator.

According to one embodiment, DERN 216 is configured to determine the sending user and/or the destination user information contained within the SIP message. Using this information and the stored valid subscriptions 210, DERN 216 determines if either of the communicators are on the valid subscription list and should be monitored. DERN 216 then generates a notify request comprising a subscription including one or more of at least the following: an event header indicating a dialog package, information about the communicator which is being monitored, and other information about the communications session itself. Once the notify request is generated by DERN 216, the notify request may be transmitted, or otherwise effectively communicated or routed, to the third party 202. According to one embodiment, the notify request may be transmitted directly to third part surveillance server 202. In another embodiment, the notify request is routed to a child node on the path to the destination indicated by the third party.

With the DEP 206, the SPM 200 can also transport Subscribe and Notify SIP messages to and from potential trace targets for the message summary event package (RFC 3842). Such Subscribe and Notify SIP messages carry indications of changes in voicemail message counters, such as total number of new messages, total number of old messages (already listened to) etc., as defined in RFC 3842. Law enforcement agencies and other third parties could subscribe to such SIP messages, which may be useful in surveillance. In such embodiments, the third party 202 can subscribe to the same voicemail server that the trace target is subscribing to, and monitor Subscribe and Notify SIP messages that the target receives when voicemail counts change. In one embodiment, this may be done directly using industry standards described in RFC 3842. In another embodiment, DEP 206 may be involved to monitor Subscribe and Notify SIP messages.

In an alternative embodiment, a third party agent 214 can be instantiated. The third party agent 214 receives and processes SIP event data on behalf of the third party server 202. The third party agent 214 can queue event notifications based on local policy. For example, the third party agent 214 can accumulate SIP events over time, and send them to the third party server 202 at designated times or upon the occurrence of certain events. The third party agent 214 could gather or retrieve all SIP events 212 associated with each call and send them together to the third party server 202 after the associated call terminates. Alternatively, the third party agent 214 could gather or retrieve SIP events 212 for each call over the course of a certain time duration (e.g., one week), group the events by call, and send the call-grouped events at the end of the time duration.

Exemplary Operations

Figure 3:
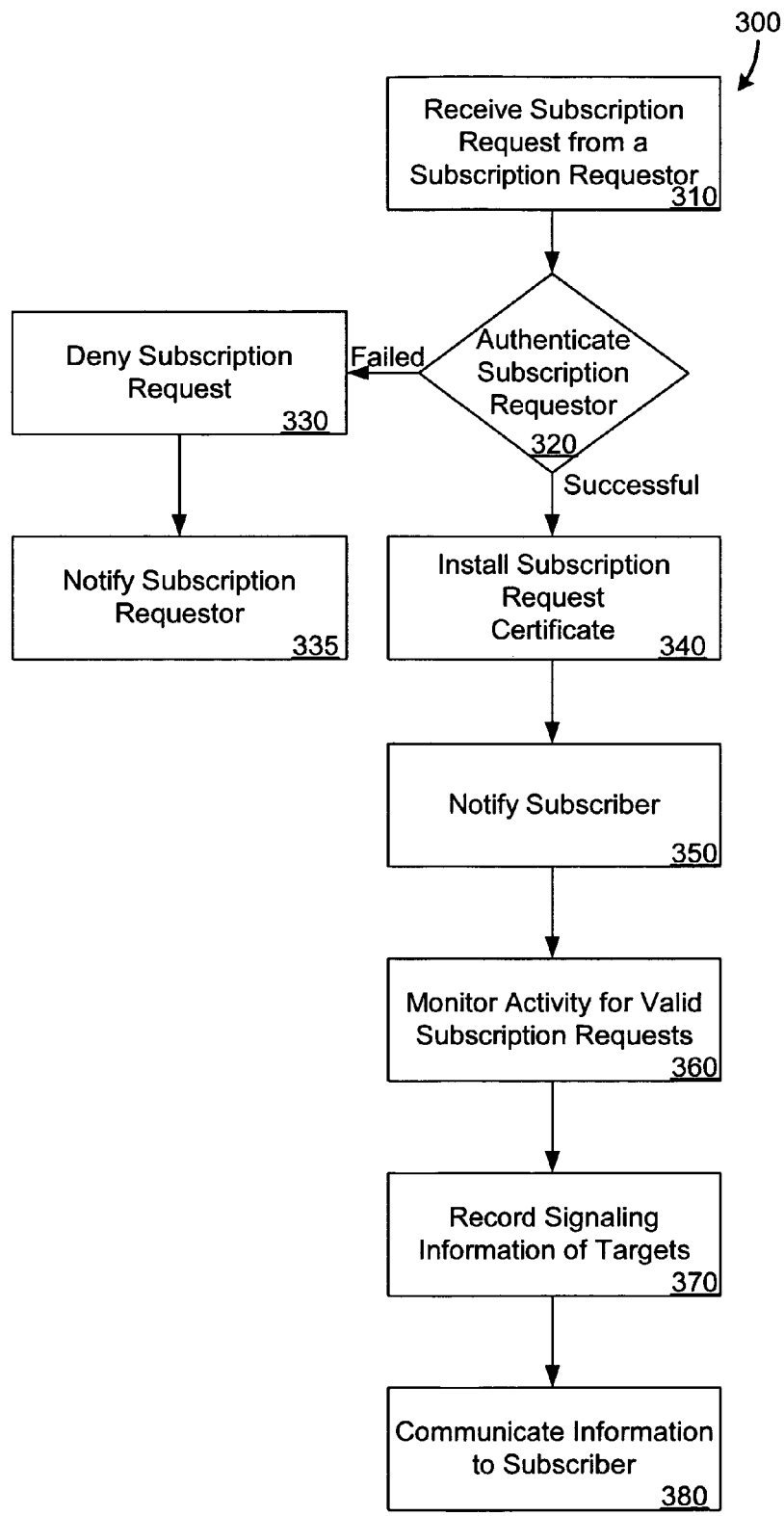
FIG. 3 is a high level flow chart describing exemplary operations for monitoring electronic communications in accordance with one embodiment of the present invention.

FIG. 3 illustrates a high level flow diagram 300 in accordance with one embodiment of the present invention. In the illustrated embodiment, a signaling path manager of a VoIP network, or the like, is configured to receive a subscription request from a subscription requester at step 310. The subscription requester is typically an authorized tap entity such as law-enforcement agency. The subscription request is generally a request to monitor one or more targeted endpoint(s) (also referred to as target(s)). Various identifying information may be included in this request to verify the authority of the subscription requestor and information for identifying the target. Additional information and subscription guidelines may be included in the subscription request. For example, in some embodiments, the subscription request may include a subscription expiration stamp.

At step 320, the subscription request is authenticated. According to various embodiments, this authentication process includes both an authentication of the subscription requestor and the subscription request itself. If the authentication fails for any reason, the subscription request is denied at step 330 and then the result is communicated to the subscription requestor at step 335.

Figure 4:
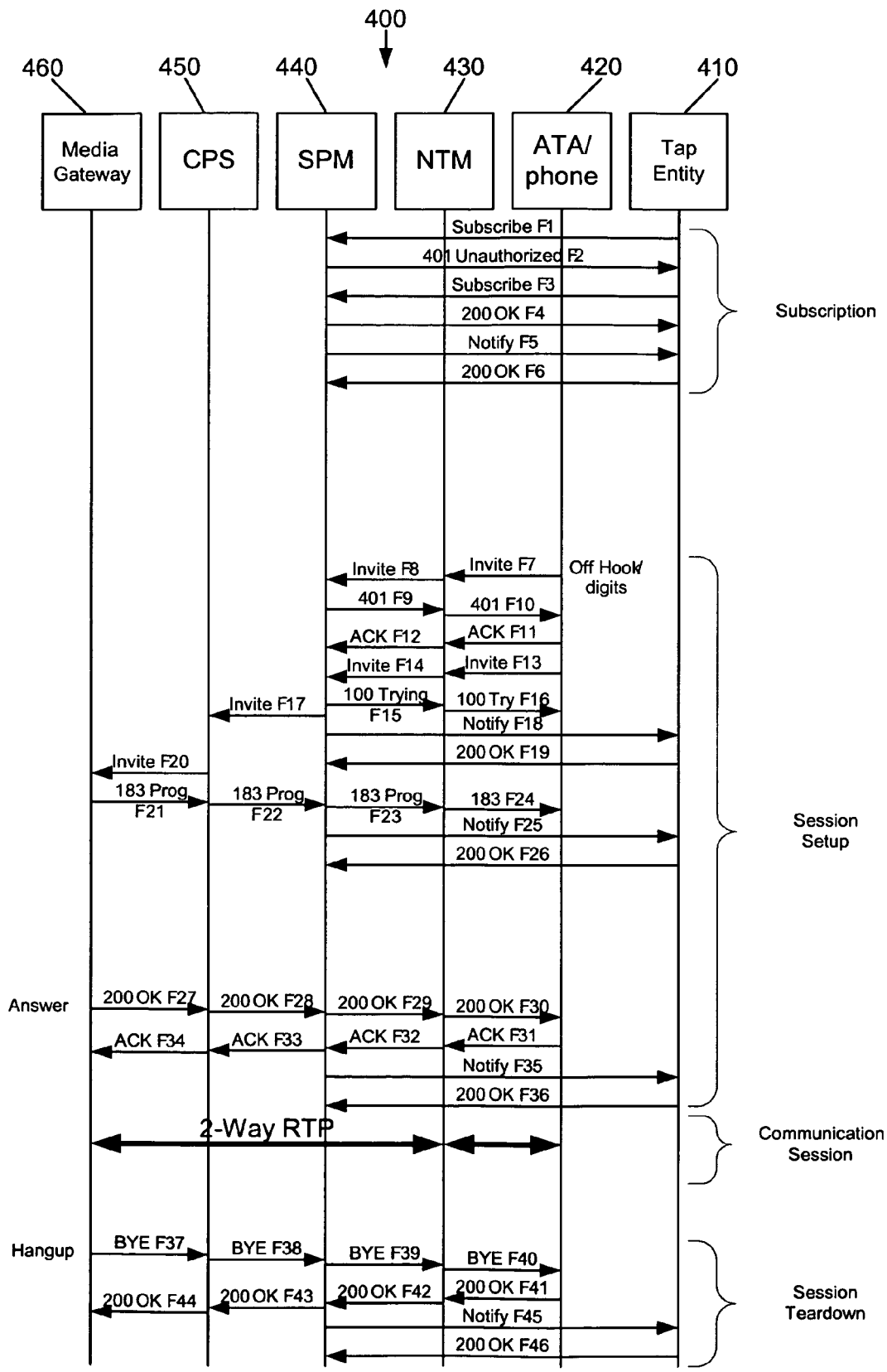
FIG. 4 is an exemplary high level timing diagram showing the subscription process and corresponding communications session protocol and event notifications in accordance with one embodiment of the present invention.

To authenticate the tap entity (third party), in one embodiment, digest authentication is used. For example, digest authentication as defined in RFC 2617, which is hereby incorporated by reference for all purposes, may be used for any SIP request, including the Subscribe from the third party (e.g., law enforcement agency (LEA)). This type of authentication involves challenging the request with a 401 Unauthorized response containing a WWW-Authenticate header. This header contains seed information. The third party subscriber uses the seed along with a secret (e.g., a password), shared with the server (e.g., SPM 150 in FIG. 1 or SPM 200 in FIG. 2) the Subscriber was sent to as input to an algorithm to produce an output value. The value is sent back to the SPM 150 in an Authorization header within a new Subscribe request. The SPM 150 performs the same algorithm with the same inputs the subscriber used and checks the resulting answer against the value in the received Authorization header. If the answers match, the SPM 150 determines that the Subscriber used the correct password. This mechanism allows authentication without actually sending the password over the network. FIGS. 4 and 5 describe in more detail an exemplary embodiment of the present invention which utilizes digest authentication.

If the authentication is successful, the verified subscription request is installed at step 340. Installing valid subscriptions can include storing the subscriptions in memory. At step 350, the subscriber is notified of the successful installation and may also be notified of the current dialog state of the target. As previously mentioned, the subscription request may contain guidelines or parameters which must be satisfied in order for the subscription to be valid. For example, in some embodiments, a subscription commencement and expiration date may be included. In these cases, the signaling path manager may be used, for example, to check the validity of the subscription request on a predetermined interval.

The dialogs of targets are monitored for the requested activity including state transitions indicating various call signaling activities at step 360. One embodiment of monitoring step 360 involves a dialog events package monitoring SIP signals that are routed through the SPM. A dialog events package allows users to subscribe to another user and subscribe to dialogs between endpoints and receive notifications about changes in communication session status. The various notifications used in the dialog event package contain partial information about the communications covered by the subscription. In some embodiments, NOTIFY signals are sent to inform the subscribing service of changes in the communication session state. Since the information typically contained in the NOTIFY dialogs is only partial, the information will have to be collected and combined to form a more complete description of the communication activities.

In any case, the various activity may then be recorded, step 370, and then communicated to either the subscription requestor or a destination designated by the subscription requestor at step 380. In some embodiments, the recorded activity may be used to generate a report, in a pre-determined format, specifying the activity of the target at a desired level of detail. For example, the report may comprise a collection of target identifiers, event dialogs, and call signaling activities for one or more of the one or more targets being monitored. Then, for example, the report can be transferred, or communicated, to the subscription requestor. In other embodiments, the recorded activity may be communicated to the subscription requestor, an acquisition facility, or the like on a real-time basis as it is collected from the target.

FIG. 4 is a timing diagram illustrating one exemplary communication session scenario, in which SIP data associated with the communication session are detected and made known to a third party subscriber. Generally, a number of states of the monitoring process are depicted: subscription, session setup, the communication session, and session teardown (i.e., termination). Monitoring typically occurs during the session setup and/or session teardown stages. In this embodiment, state changes are monitored for a subscribing third party.

In the embodiment depicted, tap entity 410 sends a subscription request F1 to the SPM 440 to collect call-identifying information about a communication device 420 of a targeted user. The subscription request identifies the tap entity 410 and the targeted communication device 420 (i.e., the target). For example, the subscription request can include a phone number, Internet address, or universal resource identifier associated with the targeted user. The subscription may also include an expiration date specifying the duration of the subscription. The SPM 440 checks the subscription request F1 for authentication credentials and sees valid credentials are not present, so it responds with an unauthorized message F2 challenging the tap entity 410 to prove the tap entity's 410 identity. Tap entity 410 resends a similar subscription request F3 with additional information proving its identity. SPM 440 inspects the new information in new request F3 to authenticate the subscription request F3 is from the tap entity 410. An OK message F4 is sent from SPM 440 to tap entity 410 to indicate SPM 440 received and accepted the subscription request F3 after SPM 440 authenticates the subscription request F3 and validates the contents of the subscription request F3. The SPM 440 then installs the requested subscription and sends notify message F5 to the subscriber, the tap entity 410, to indicate the successful installation of the request and optionally the current state of targeted communications device 420. Tap entity 410 sends an OK message F6 to SPM 440 to indicate tap entity 410 received and accepted notify message F5.

When a communications session (e.g., phone call) is initiated by targeted communication device 420 to a destination communicator, various initiation signals are routed through SPM 440. Targeted communication device 420 transmits invite F7, which is received by NTM 430. NTM 430 responsively sends a corresponding invite signal F8 to SPM 440. SPM 440 and then NTM 430 respond to the target 420 with SIP 401 signals F9-F10, requesting the communicator 420 to provide identification credentials so that the SPM 440 can determine the target's 420 identity. In response, acknowledgement signals (ACK F11 and ACK F12) are transmitted to SPM 440. Invite F13 and invite F14 are then sent to the SPM 440 containing appropriate credentials. Based on the target's 420 address, the SPM 440 checks valid dialog subscriptions to determine whether the communicator 420 should be monitored.

SPM 440 sends invite F17 to call processing system (CPS) 450. A communication session attempt notification F18 is sent by SPM 440 to tap-entity 410 to notify the tap entity 410 that a communication session was attempted by the target 420. Tap entity 410 responds with OK message F19.

The communication session is set up with the CPS 450 sending SIP invite signal F20 to media gateway 460. SIP session progress signals F21-F24 are sent by media gateway 460, CPS 450, SPM 440, and NTM 430, respectively to indicate that the communication session setup is in progress. A communication session attempt notification F25 is sent by SPM 440 to tap-entity 410 to notify the tap entity 410 that a communication session setup is in progress. Tap entity 410 responds with OK message F26.

When the communication session is set up (e.g., the destination user answers the phone) at the destination, OK signals F27-F30 are sent from media gateway 460 to target 420. Acknowledgement signals F31-F34 are responsively communicated from the target 420 to the media gateway 460. Upon receiving ACK F32, the SPM 440 communicates a notify signal F35 to the tap entity 410 to notify the tap entity 410 that the communication session has been successfully set up. Tap entity 410 responds with OK message F36.

Once the call is initiated, standard 2-way real time protocol (RTP) is used to transfer real-time content of the communication session. When one of the participants in the communication session terminates the communication session (e.g., hangs up), a SIP Bye signal is communicated to the SPM 440. In the exemplary scenario illustrated, the destination user terminates the call. Accordingly, SIP Bye signal F37 is transmitted to CPS 450, which sends corresponding SIP Bye signal F38 to SPM 440. SPM 440 is able to determine which participant in the communication session terminated the session, in this case, the destination user. SPM 440 can also use the Bye signal F38 to determine the duration of the communication session or other information about the communication session. Bye signals F39 and F40 are sent to the NTM 430 and the targeted communication device 420, respectively.

In response, corresponding OK signals F41-F44 are communicated from the target 420, NTM 430, SPM 440, and CPS 450, respectively. Upon receiving OK signal F42, SPM 440 can transmit SIP event notification signal F45 to the tap entity. The SIP event notification signal F45 notifies the tap entity 410 that the communication session was terminated, and can include which user terminated the session. Tap entity 410 sends OK signal F46 in response to event notification signal F45.

For illustrative purposes, exemplary data associated with signals shown in FIG. 4 are depicted in FIGS. 5a-5f. Signals typically include headers and bodies that include information relevant to surveillance of a targeted user. FIGS. 5a-5f provides an exemplary subscription request and notification dialog in accordance with embodiments of the present invention. The exemplary embodiment depicted in these figures are based on a dialog event package.

Various header fields and message bodies are used in the communication to indicate subscription requests, call-identifying information, and the like. In the examples depicted, F3 represents a signal from the tap-entity 410 to the SPM 440. Subscribe request line 505 indicates the subscription request. A communicator identifier 510 identifies the target 420 that should be monitored by SPM 440. The subscription request contains a variety of other information including who the request was from 515, where to send notifications 520, expiration 525, authentication credentials 530 and the like. Expiration can correspond to virtually any time duration, ranging from minutes to years. In the example depicted, the expiration 525 is set for 315,360,000 seconds, which corresponds to 10 years.

Messages F4-F6 complete the subscription process with OK, Notify, and OK SIP messages. In messages F5, F18, F25, F35 and F45, the bodies of the Notify messages are formatted in eXtensible Markup Language (XML). These messages contain a variety of call-signaling information as previously discussed which may be used to generate reports for the tap-entity In message F5 the "entity" indicator 535 identifies the target 420. In message F18 the "entity" indicator 540 identifies the target 420, and the "state" indicator 545 identifies a request for a communication session setup has been received. In message F25 the "entity" indicator 570 identifies the target 420, and the "state" indicator 575 identifies a communication session setup attempt is in progress. In message F35 the "entity" indicator 580 identifies the target 420, and the "state" indicator 585 identifies a communication session setup attempt has been answered. In message F45 the "entity" indicator 590 identifies the target 420, and the "state" indicator 595 identifies a communication session has been terminated by the remote party the target 420 was communicating with.

Message F18 illustrates an exemplary NOTIFY message from the SPM 440 to the tap-entity 410. For example, "entity" indicator 540 of message F18 identifies the target 420. The "state" indicator 545 of message F18 identifies a request for a communication session setup has been received. Under "local" indicator 550 of message F18 "identity" indicator 555 identifies who is attempting to initiate a communications session (e.g., who is making a call, the initiator), and under "remote" indicator 560 of message F18 "identity" indicator 565 identifies who a communications session is being attempted to (e.g., who is being called, the recipient). In the exemplary scenario of FIG. 4, target 420 initiated the communication session. By identifying the initiator and recipient of the communication session, the SPM 440 indicates the direction of the communication session.

Exemplary Application to Voicemail

In embodiments previous described the SPM transports Subscribe and Notify SIP messages to and from potential trace targets for the message-summary event package (RFC 3842). These particular Notify messages carry indications of changes in voicemail message counters such as total number of new messages, total number of old messages (already listened to) etc. as defined in RFC 3842, which is hereby incorporated by reference for all purposes.

According to one embodiment, information about the voicemail would be useful to LEAs and thus communicated to them. While the standard dialog event package is only designed to carry events related to Invite initiated dialogs (phone calls), it may be augmented by defining a new event package to also report these voicemail count changes.

In another embodiment, the information is collected by using the same message-summary event package. To accomplish this, the LEA subscribes to the same voicemail server the trace target is subscribing to, thus the LEA would see all the same Notify messages the target sees when voicemail counts change.

Figure 6:
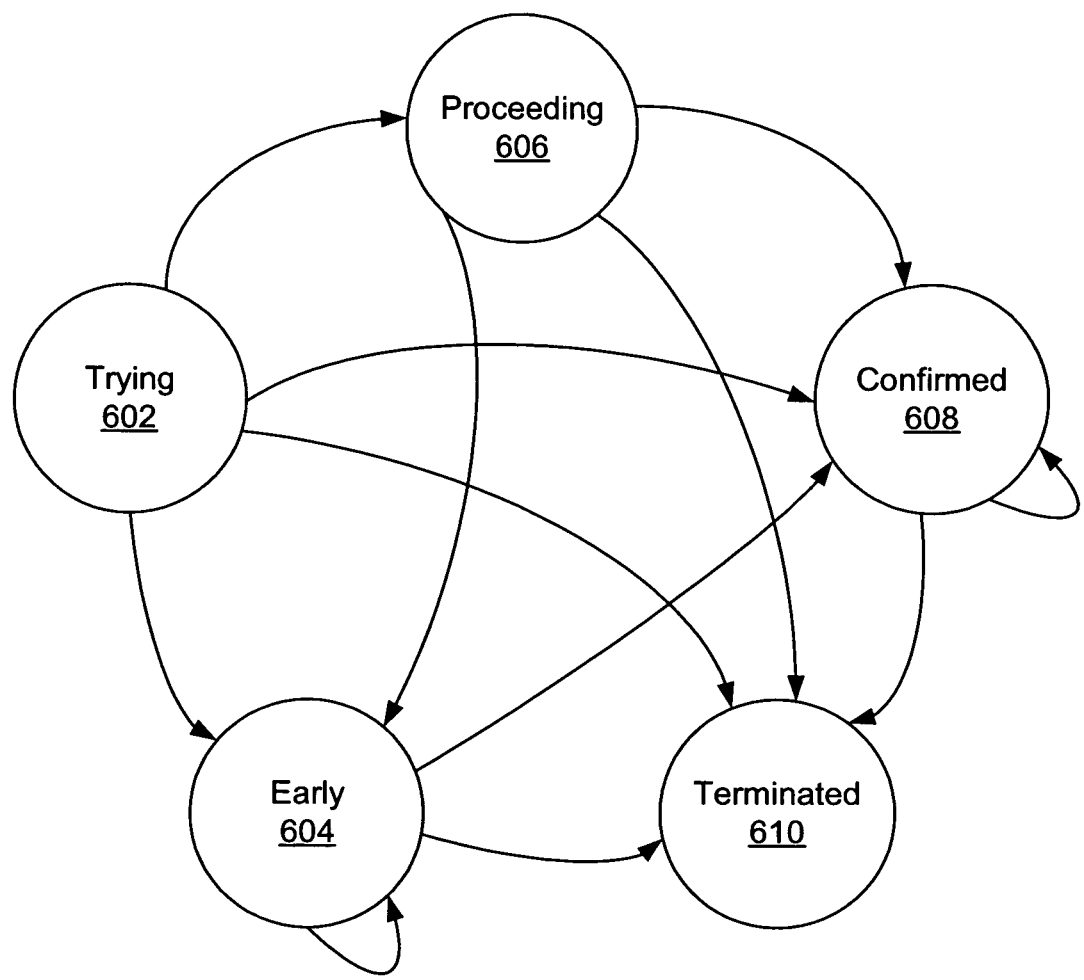
FIG. 6 is a state transition diagram illustrating exemplary states that a signal path manager may enter in accordance with an embodiment of the present invention.

FIG. 6 is a state transition diagram illustrating exemplary states that a signal path manager may enter in accordance with an embodiment of the present invention. The state transition diagram reflects teachings from "Request for Comments 4235" (RFC 4235). According to this embodiment, a transition between any of the states results in a Notify message being sent to the LEA. In a trying state 602, the SPM attempts to set up a communication session between an origination and a destination. If a "1xx" message is received, the SPM can enter an early state 604, in which a ringback may be sent.

If a 100 response is received in response to trying to set up the communication session, the SPM enters the proceeding state 606. The SPM may then enter the confirmed state 608, in which the communication session has been established. In the confirmed state 608, a communication session established event is reported, meaning that an answer was received from the destination. When the communication session ends (e.g., one party hangs up), or if there is no answer during the trying state 602, the SPM enters a terminated state 610. In the terminated state, a communication session termination event is reported. Those skilled in the art will appreciate that other states may be included without straying from the spirit and scope of the present invention.

Exemplary General-Purpose Computer

Figure 7:
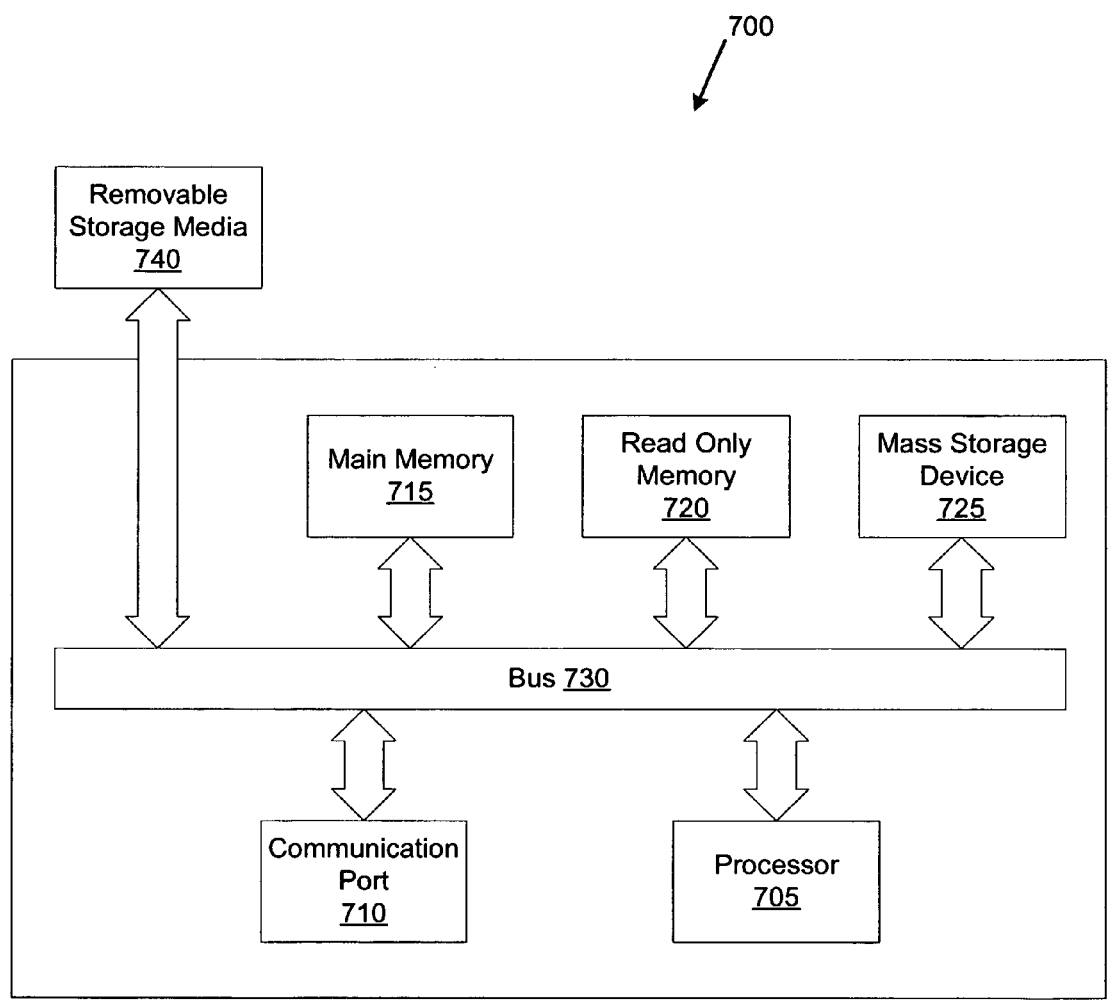
FIG. 7 illustrates an example of a general-purpose computer system with which embodiments of the present invention may be utilized.

Embodiments of the present invention include various steps, which were described in more detail above. A variety of these steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 7 is an example of a computer system 700 with which embodiments of the present invention may be utilized. According to the present example, the computer system includes at least one processor 705, at least one communication port 710, a main memory 715, a read only memory 720, a mass storage 725, a bus 730, and a removable storage media 740.

Processor(s) 705 can be any know processor, such as, but not limited to, an Intel® Itanium® or Itanium 2® processor(s), or AMD® Opteron® or Athlon MP® processor(s), or Motorola® lines of processors. Communication port(s) 710 can be any of an RS-232 port for use with a modem based dialup connection, a 10/100 Ethernet port, or a Gigabit port using copper or fiber. Communication port(s) 710 may be chosen depending on a network such a Local Area Network (LAN), Wide Area Network (WAN), or any network to which the computer system 700 connects.

Main memory 715 can be Random Access Memory (RAM), or any other dynamic storage device(s) commonly known in the art. Read only memory 720 can be any static storage device(s) such as Programmable Read Only Memory (PROM) chips for storing static information such as instructions for processor 705.

Mass storage 725 can be used to store information and instructions. For example, hard disks such as the Adaptec® family of SCSI drives, an optical disc, an array of disks such as RAID, such as the Adaptec family of RAID drives, or any other mass storage devices may be used.

In conclusion, embodiments of the present invention provides novel systems and methods to facilitate tracing of communication session signaling of a particular user, and more specifically for collecting communication session signaling and event notification information of a monitored user based on an authorized surveillance request. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A dialog event route node (DERN), comprising:
at least one processor; and
memory storing computer executable instructions, that when executed by the at least one processor cause the at least one processor to perform the steps of:
receiving a Session Invitation Protocol (SIP) request at a network communicated between a sending communicator and a destination communicator;
determining if the SIP request contains user identification information identifying one or both of the sending communicator and the destination communicator;
searching one or more active surveillance subscriptions associated with a dialog event package to identify a surveillance subscription corresponding to one of the sending communicator and the destination communicator identified by the user identification information;
in a response to identifying a surveillance subscription that corresponds to one of the sending communicator and the destination communicator identified by the user identification information, generating a notify request comprising an event header indicating the dialog event package and a body containing at least a communicator identifier corresponding to the one of the sending communicator and the destination communicator, and a dialog identifier identifying a communication session associated with the SIP request; and reporting the notify request to a third-party surveillance server.

2. A DERN as recited in claim 1, wherein the communicator identifier comprises a uniform resource identifier associated with the one of the sending communicator and the destination communicator.

3. A DERN as recited in claim 1, wherein the body of the notify request is formatted in extensible Markup Language (XML).

4. A dialog event route node as recited in claim 1, wherein the DERN is further operable to report one or more changes in voicemail message counters.

5. A dialog event route node as recited in claim 1, wherein the real time information is in a format selected from the group consisting of Real Time Protocol (RTP), Session Initiation Protocol (SIP), signaling system 7 (SS7), and Standard General Markup Language (SGML).

* * * * *